United States Patent [19]

Burnham

[11] 3,914,793

[45] Oct. 21, 1975

[54] TAPE RECORDER ALIGNMENT APPARATUS

[76] Inventor: William W. Burnham, 452 Latham Road, Mineola, N.Y. 11501

[22] Filed: Apr. 30, 1974

[21] Appl. No.: 465,623

[52] U.S. Cl. .................... 360/134; 360/77; 360/109

[51] Int. Cl.$^{2}$ ....................... G11B 23/38; G11B 5/62

[58] Field of Search ........ 360/134, 109, 77; 274/43, 274/41.4; 242/199

[56] References Cited

UNITED STATES PATENTS 3,729,203 4/1973 Kinard ................................ 360/134

3,812,538 5/1974 Stone, Jr. et al.................... 360/134

*Primary Examiner*—Alfred H. Eddleman

*Attorney, Agent, or Firm*—James J. Maune

[57] ABSTRACT

Disclosed is an apparatus for aligning the transducers of a magnetic tape recording system. The apparatus comprises a transparent tape with longitudinal markings having a transverse displacement from a longitudinal line corresponding to the center line of a recording track on the magnetic recording tape.

9 Claims, 4 Drawing Figures

TAPE RECORDER ALIGNMENT APPARATUS

BACKGROUND OF THE INVENTION

The present invention relates to magnetic tape recording systems and particularly to apparatus for aligning the transducers in such systems.

Magnetic tape recording systems are commonly known and used both in home entertainment and in industry. In home entertainment such systems are used for recording and playing back recorded sounds on a magnetic tape. The sounds may be musical entertainment or the homemade voice recordings of the family. In industry such recording systems are used for dictating purposes and also for storage of signals other than sounds. Magnetic tape systems have gained popularity in computer systems for data storage and retrieval and also for storage of television signals.

A magnetic tape recording system is usually implemented by transporting a thin tape past recording and play-back transducers. The tape has a thin coating of ferromagnetic material which is magnetized in accordance with the magnetic field of a recording transducer as the tape is transported past the poles of the transducer. The magnetic field of the recording transducer is representative of signals to be recorded on the tape. When the magnetized tape is transported past the poles of a play-back transducer, the magnetic field of the ferromagnetic material induces electrical currents in the coil of the transducer which may be amplified to reproduce the recorded signals. In some systems, another transducer is used to erase or demagnetize the magnetic material on the tape so that another signal may be recorded thereon without interference from a previously recorded signal. Magnetic tape recording systems enable long term storage of signals which are not destroyed by detection or playback, but can be easily erased for reuse of the magnetic tape.

Modern recording systems make efficient use of the magnetic tape by recording a plurality of signals on parallel tracks on the magnetic tape. These parallel tracks may be used for simultaneously recording more than one signal, as in a stereo system wherein more than one channel is played back simultaneously or in a system wherein selection may be made of signals recorded on alternate parallel tracks at the operator's pleasure. In data storage systems parallel tracks enable the storage of additional data on the same amount of tape. On home entertainment or dictating systems parallel tracks enable recording with the magnetic tape moving in alternate directions with one or more tracks assigned to each direction.

Proper recording and play-back of signals on magnetic tapes require that the recording or detecting transducers be correctly aligned with the corresponding tape track. This is particularly essential in systems utilizing multiple tracks. Failure to properly align the transducers results in poor signal play-back or interchannel cross-talk, that is, a particular transducer detecting the signal recorded on an adjacent track or recording a signal which, in a properly aligned system, will be detected by the transducer corresponding to the adjacent track. Problems associated with transducer alignment are often complicated by the fact that transverse tape position may be altered by the tape transport mechanism when the tape transport mechanism is operating and the tape subjected to tension across the pulleys of the transport mechanism.

Alignment of tape recorder transducers is required initially at assembly of the tape recording system and after disassembly and repair of the transport mechanism or transducers. Since there are many manufacturers of tape recording equipment, a repairment may often replace a part of the tape transport mechanism or transducer with the corresponding part from another manufacturer, resulting in a misalignment. In other circumstances, ordinary wear on the transport components may result in misalignment of the transducer with respect to the tracks on the magnetic tape.

Available prior-art devices for aligning the transducers of a tape recording system with the actual path of a magnetic tape include a "test tape." This device comprises a magnetic tape having a predetermined tone signal recorded on each of the magnetic recording tracks. Alignment of the transducer is accomplished by transporting the tape across the transducer to be aligned and detecting the signal in the transducer. Recording as well as detecting transducers will usually have an induced electrical signal output in response to the motion of the magnetized tape. Alignment using this prior-art apparatus is accomplished by adjusting the position of the transducer until the output electrical signal reaches a peak value. Alignment by this technique is not particularly satisfactory in a system wherein the tracks of the tape are closely spaced and alignment is critical. In particular, the "peak" of the transducer response is often not well defined in the output signal and a rather broad range of adjustment may be interpreted as the peak signal by the mechanic. Further in order to use this prior-art alignment system, a special test setup is required, usually including an oscilloscope or other apparatus for observing the amplitude of the detected test signal. Such a setup also requires special electrical connections to the transducer output which may not be available on an assembled recorder.

SUMMARY OF THE INVENTION

It is, therefore, an object of the present invention to provide an apparatus for aligning the transducers of a magnetic tape recording system.

It is a further object of the present invention to provide such an apparatus whereby alignment may be achieved by visual observation and manual adjustment of the transducer position.

It is a still further object of the present invention to provide such an apparatus whereby alignment may be achieved while the tape transport mechanism of the recording system is operating.

In accordance with the present invention, there is provided apparatus for use in a system for recording and playing back recorded signals on a magnetic tape, wherein the tape is mechanically transported with respect to recording or detecting transducers and wherein the signals are represented by the magnetic state of at least one longitudinally disposed recording track on the magnetic tape. The apparatus is for aligning the transducers with the recording track and comprises a flexible transparent tape, having a width substantially equal to the width of the magnetic tape. The apparatus also comprises at least one longitudinally disposed visible marking on the tape, the marking having a selected transverse displacement from a longitudinal line on the tape corresponding to the center-line of one of the recording tracks on the magnetic tape.

For a better understanding of the present invention together with other and further objects therefore, reference is had to the following description taken in conjunction with the accompanying drawings and its scope will be pointed out in the appended claims.

DESCRIPTION AND OPERATION OF THE EMBODIMENT OF FIG. 2

Figure 1:
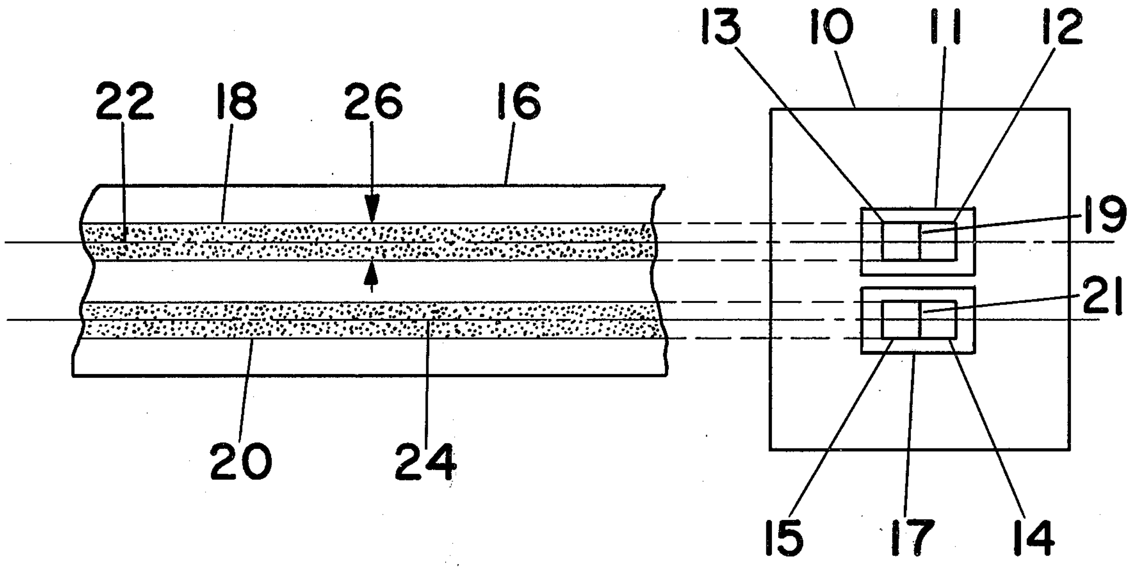
FIG. 1 (PRIOR ART)
FIG. 1 shows a prior-art magnetic tape having signals recorded on two tracks and a transducer mounting having a pair of transducers corresponding to the tracks.

FIG. 1 shows a portion of a magnetic tape recording system in accordance with prior-art. There is included a transducer mounting 10 having a pair of transducers for recording or detecting signals on a pair of tracks on magnetic tape 16. Shown on transducer mounting 10 is a first transducer 11 comprising first transducer pole 12 and second transducer pole 13. Electrical signals applied to the first transducer are manifested as magnetic fields across the small gap 19 between transducer poles 12 and 13. Likewise magnetic fields applied across gap 19 cause an induced current in the coil of transducer 11. There is also included on transducer mounting 10 a second transducer 17 comprising first transducer pole 15 and second transducer pole 14. Electrical signals applied to the second transducer are manifested as magnetic fields across the gap 21 between transducer poles 15 and 14.

There is also shown in FIG. 1 magnetic tape 16 which includes first and second magnetic recording tracks 18 and 20. Recording tracks 18 and 20 are not recognizable by visual inspection of the tape, but are manifested only in that they have a magnetic state representative of the signal recorded on each track. The magnetic tracks 18 and 20 are formed by applying electrical signals to transducers 11 and 17 while tape 16 is mechanically transported across transducer mounting 10, thereby recording signals on tracks 18 and 20. For each recording system type where are a series of specifications for characterizing the location of the center-lines 22 and 24 of tracks 18 and 20 and the width 26 of each of the tracks. By reason of these specifications it is possible to record signals on the tracks of a tape using one recording machine and detect the signals using another machine. Effective recording and detection requires that transducers 11 and 17 be properly aligned with invisible recording tracks 18 and 20 of tape 16.

Figure 2:
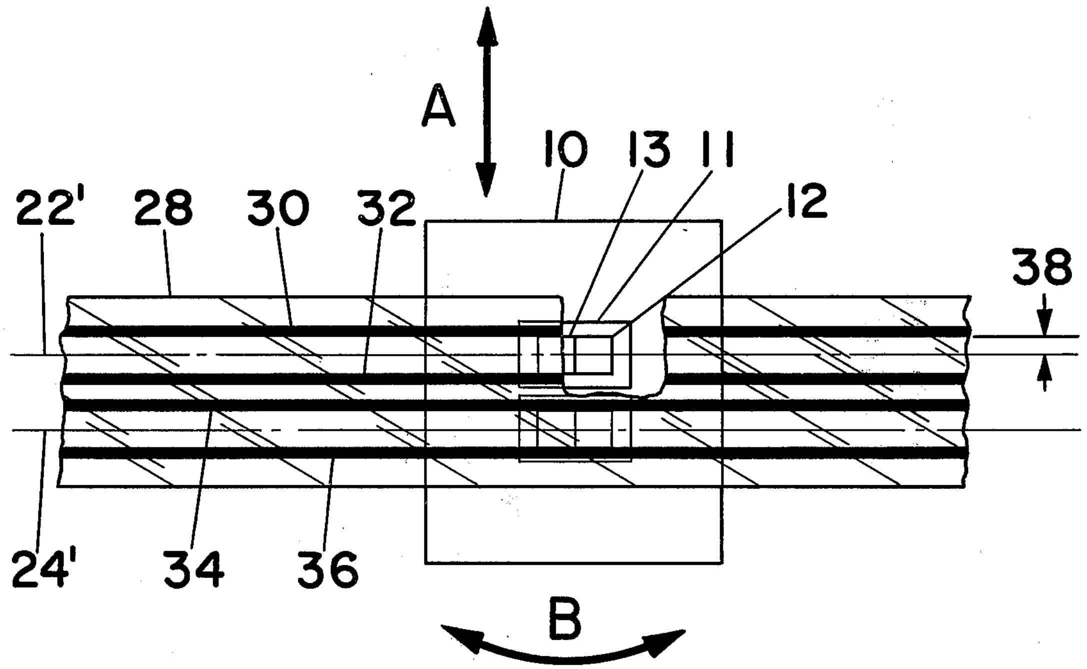
FIG. 2 shows an embodiment of the present invention having two longitudinal markings corresponding to each of the recording tracks of the magnetic tape of FIG 1.

FIG. 2 shows an apparatus for aligning the transducer in a magnetic tape recording system constructed in accordance with the present invention. The apparatus comprises a transparent tape 28 which is of the same width and flexibility as magnetic tape 16. On tape 28 there are a series of longitudinally disposed marks 30, 32, 34 and 36. These markings are formed onto the transparent tape utilizing conventional printing techniques according to the material from which the tape is made.

Longitudinal marking 30 on transparent tape 28 has a transverse displacement 38 from a longitudinal line 22' on the tape 28 corresponding to the centerline 22 of magnetic recording track 18. In the embodiment of FIG. 2, longitudinal marking 32 is equally displaced on the opposite side of longitudinal line 22'. Longitudinal markings 30 and 32 are therefore symmetrically displaced with respect to longitudinal line 22' corresponding to the center-line 22 of magnetic recording track 18 on magnetic tape 16.

Longitudinal markings 34 and 36 are similarly disposed from longitudinal line 24' which corresponds to center-line 24 of magnetic tape 16. In the embodiment of FIG. 2 the longitudinal markings 30, 32, 34 and 36 on transparent tape 28 are displaced from longitudinal lines 22' and 24' by distances corresponding to one-half the transverse width of transducer poles 12, 13, 14 and 15. When transparent tape 28 is placed on a magnetic recording device having a properly aligned transport mechanism and transducer mounting 10 as shown in FIG. 2, the transducer poles 12, 13, 14 and 15 will be visible behind markings 30, 32, 34 and 36 and the remainder of transducers 11 and 17 will not be visible. In the drawing of FIG. 2 tape 28 is shown partially cut-out to show the location of transducer poles 12 and 13 with respect to markings 30 and 32. If transducer mounting 10 is not properly aligned for recording or detecting signals on magnetic recording tracks 18 and 20 of magnetic tape 16, either by reason of transverse displacement of the transducer mounting, indicated by A in FIG. 2, or by reasons of angular misalignment indicated by B in FIG. 2 one edge of the transducer poles 12, 13, 14 and 15 will be partially visible through transparent tape 28, indicating the misalignment.

It will be evident that tape 28 is particularly useful for attaining correct misalignment of transducer mounting 10 following initial assembly or repair of the magnetic recording apparatus. Particularly important is the feature that tape 28 may be used to align mounting 10 under actual operating conditions of the tape transport mechanism, whereby allowing alignment with the tape under the actual conditions of tension and transverse displacement encountered in recording or play-back operation. Initial alignment may, of course, be accomplished with the transport mechanism stationary and the transparent tape 28 merely threaded across transducer mounting 10. Following this initial static alignment, the dynamic alignment may be checked and adjusted with the transparent tape 28 in motion across mounting 10 under substantially the same conditions as magnetic tape 16 wound encounter.

DESCRIPTION OF THE EMBODIMENTS OF FIG. 3 AND FIG. 4

Figure 3:
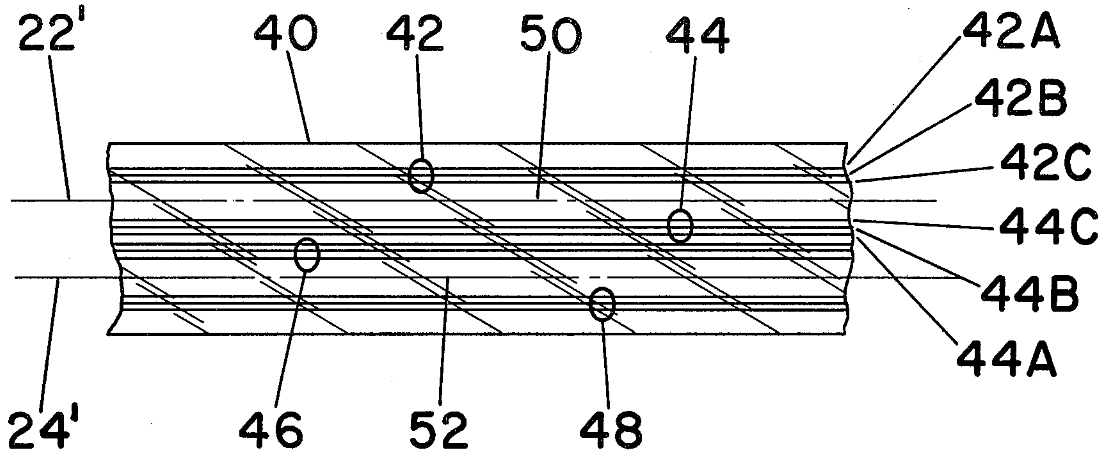
FIG. 3 shows an embodiment of the present invention having a plurality of calibrated longitudinal markings.

FIG. 3 shows an alternate embodiment of the invention. In the embodiment of FIG. 3 there is shown a transparent tape 40 having longitudinal markings sets 42, 44, 46 and 48. Each of the longitudinal markings 42, 44, 46 and 48 comprises a set of three calibrated markings. Marking set 42 includes calibrated markings 42A, 42B and 42C. Likewise marking set 44 includes calibrated markings 44A, 44B and 44C. Each of the individual markings in sets 42 and 44 has a calibrated displacement from a longitudinal line 22' on transparent tape 40 corresponding to the center-line 22 of magnetic recording track 18 on magnetic tape 16. The transverse distance on tape 40 between longitudinal line 22' and calibrated marking 42A is equal to the distance between longitudinal line 22' and calibrated marking 44A. Likewise calibrated markings 42B and 44B are symmetrically located with respect to longitudinal line 22' and also markings 42C and 44C. Longitudinal marking sets 46 and 48 have similar calibrated markings symmetrically disposed about longitudinal line 24' corresponding to center-line 24 of magnetic recording track 20. Calibrated markings 42, 44, 46 and 48 are used similar to the markings 30, 32, 34 and 36 of tape 28. The advantage of the calibrated markings is that they may more easily be used for aligning a transducer wherein the poles of the transducers having different transverse widths or spacing. According to the transverse width of the transducer poles a different pair of calibrated markings may be used to achieve accurate alignment.

Figure 4:
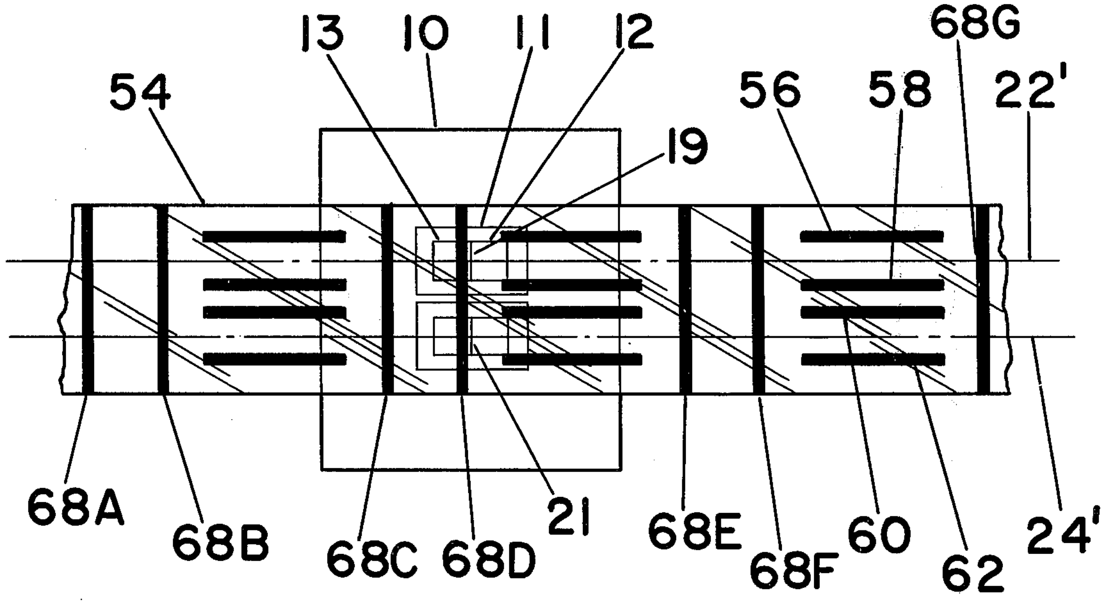
FIG. 4 shows an embodiment of the present invention having periodically interrupted longitudinal markings and also having transverse markings.

In FIG. 4 there is shown still another embodiment of the present invention. In the FIG. 4 embodiment there is shown transparent tape 54 having longitudinal markings 56, 58, 60 and 62. As in the above described embodiments, longitudinal markings 56 and 58 are symmetrically disposed with respect to longitudinal line 22' corresponding to center-line 22 of magnetic recording track 18. Likewise longitudinal markings 60 and 62 are symmetrically disposed with respect to longitudinal line 24' corresponding to center-line 24 of magnetic recording track 20. The longitudinal markings 56, 57, 60 and 62 on tape 54 comprise a plurality of periodically interrupted lines. The advantage inherent in this embodiment is that the edges of transducer poles 12, 13, 14 and 15 are visible through tape 54 at the portion of the tape corresponding to the interruption to the longitudinal lines 56, 58, 60 and 62 as is evident in FIG. 4. The visibility of the edges of transducer poles 12, 13, 14 and 15 facilitate alignment when the tape is stationary.

Additionally included on tape 54 is a plurality of transverse markings 68A, 68B, 68C, 68D, 68E, 68F and 68G. The transverse markings 68 are useful in angularly aligning transducer gaps 19 and 21 of transducers 11 and 17 by rotation of the transducer mounting 10 as indicated by arrow B in FIG. 2. The gaps 19 and 21 may be aligned by rotating mounting 10 until gaps 19 and 21 are correctly aligned with the adjacent transverse marking such as marking 68D shown in FIG. 4.

While there has been described what are at present considerated to be the preferred embodiment of the invention, it will be obvious to those skilled in the art that various changes and modifications may be made therein without departing from the invention and it is, therefore, aimed to cover all such changes and modifications as fall within the true spirit and scope of the invention.

What is claimed is:

1. In a system for recording and playing back recorded signals on a magnetic tape of a selected width, wherein said tape is mechanically transported with respect to recording or detecting transducers and wherein said signals are represented by the magnetic state of at least one longitudinally disposed recording track on said magnetic tape, apparatus for aligning said transducers with said recording track, comprising:

a flexible transparent tape, having a width substantially equal to the width of said magnetic tape;

and at least one longitudinally disposed visible marking on said tape, said marking having a selected transverse displacement from a longitudinal line on said tape corresponding to the center-line of one of the recording tracks on said magnetic tape.

2. Apparatus as specified in claim 1 wherein there are at least two longitudinally disposed markings on said tape, said markings being symmetrically displaced from said longitudinal line.

3. Apparatus as specified in claim 1 wherein there is one of said markings for each of said recording tracks.

4. Apparatus as specified in claim 1 wherein there are two of said markings of said recording tracks.

5. Apparatus as specified in claim 4 wherein said markings comprise a plurality of calibrated longitudinal lines.

6. Apparatus as specified in claim 4 wherein said markings comprise periodically interrupted longitudinal lines.

7. Apparatus as specified in claim 1 which additionally includes a plurality of transverse markings on said tape.

8. Apparatus as specified in claim 4 which additionally includes a plurality of periodically disposed transverse markings on said tape.

9. Apparatus as specified in claim 6 which additionally includes a plurality of periodically disposed transverse markings on said tape.

* * * * *